United States Patent [19]

Eaton

[11] 4,191,406

[45] Mar. 4, 1980

[54] QUICK ACTING COUPLING

[76] Inventor: Edward M. Eaton, 3727 Valle Vista, Chino, Calif. 91710

[21] Appl. No.: 939,333

[22] Filed: Sep. 5, 1978

[51] Int. Cl.² ............................................. F16L 37/12
[52] U.S. Cl. .................................... 285/35; 285/315; 285/322
[58] Field of Search ...................... 285/35, 34, 33, 320, 285/315, 322

[56] References Cited

U.S. PATENT DOCUMENTS

| | | | |
|---|---|---|---|
| 978,957 | 12/1910 | Sutton | 285/315 |
| 1,815,660 | 7/1931 | Walker | 285/315 |
| 2,327,714 | 8/1943 | Iftiger, Sr. | 285/35 |
| 3,096,999 | 7/1963 | Ahlstone et al. | 285/315 X |
| 3,394,950 | 7/1968 | Jensen | 285/35 |
| 3,870,332 | 3/1975 | Eaton | 285/35 |
| 3,997,197 | 12/1976 | Marsh et al. | 285/315 X |

FOREIGN PATENT DOCUMENTS 847163  6/1939  France ...................................... 285/315

Primary Examiner—Thomas F. Callaghan
Attorney, Agent, or Firm—Fulwider, Patton, Rieber, Lee & Utecht

[57] ABSTRACT

There is disclosed a quick acting coupling for interconnecting tubular members such as hoses which is particularly useful with fire fighting equipment. The device has a body member for attachment to one of a pair of tubular members. The body member distally carries a plurality of segmented jaws which are pivotally mounted thereon to permit movement between radially expanded and contracted positions. The outer surfaces of the jaws have flat grooves having leading and trailing cam surfaces. The jaws are surrounded by a cam guide ring that is mounted for limited axial displacement on the assembly of jaws with cam guides of mating contour. The cam guide surfaces are beveled, planar surfaces and are engaged by the cam guides of the cam ring in both the opened and closed positions so that axial movement of the cam ring positively expands and contracts the segmented jaws.

6 Claims, 4 Drawing Figures

QUICK ACTING COUPLING

BACKGROUND OF THE INVENTION

This invention relates to a quick acting coupling for tubular members and in particular to a quick acting hose coupling.

BRIEF STATEMENT OF THE PRIOR ART

There have been a number of attempts to provide a quick acting hose coupling with a sufficiently positive action to permit its use for fire fighting equipment. In my recently issued patent, U.S. Pat. No. 3,870,332, I disclose a coupling having segmented jaws pivotally carried by a body member and moveable between expanded and contracted positions in response to axial displacement of an outer cam right with an arcuate cam guide. This structure permits the cam ring to be used to open the jaws into the expanded positions without relying on cumbersome and failure-prone internal springs or other resilient members used in prior devices of U.S. Pat. Nos. 2,327,714; 2,259,137; 686,389; and 520,952; and German Pat. No. 842,436.

A difficulty experienced with my prior patented design is that the cam contours on the jaws and on the cam ring are not identical in contour for ease in assembly. This, however, results in a tolerance between the cam surfaces of these elements which can cause improper operation of the coupling, interfering with opening of the jaws and releasing of the joined tubular members.

BRIEF STATEMENT OF THE INVENTION

This invention comprises a quick acting coupling member for tubular elements such as hoses and the like. The device comprises an assembly of a body member distally grooved, a plurality of segmented jaws having inboard lateral flanges seated in the distal groove of the body member, and a surrounding cam ring. The jaws pivotally move between radially expanded and contracted positions and have grooves with leading and trailing beveled shoulders to provide leading and trailing inclined cam surfaces. The assembly of jaws is surrounded by the cam ring which has a first, leading cam guide at its forward edge and a second cam guide located intermediate its width. The second cam guide is triangular in cross-section and has a leading cam edge beveled at the angle of the first, leading cam guide to mate with the leading cam surfaces of the jaw during closing of the jaws. The trailing cam edge of the second cam guide is beveled at the angle of the trailing cam surfaces of the jaw segments to mate with the latter during opening of the segments. When the ring is in its axially forward position, it contracts the leading cam surfaces and trailing shoulders of the jaws for positive locking of the jaws. The ring is limited in its axial travel by pins which project into receiving, substantially axial grooves on the outer surfaces of the jaws.

BRIEF DESCRIPTION OF THE DRAWINGS

The invention will be described with reference to the FIGS., of which.

DESCRIPTION OF PREFERRED EMBODIMENTS

Figure 1:
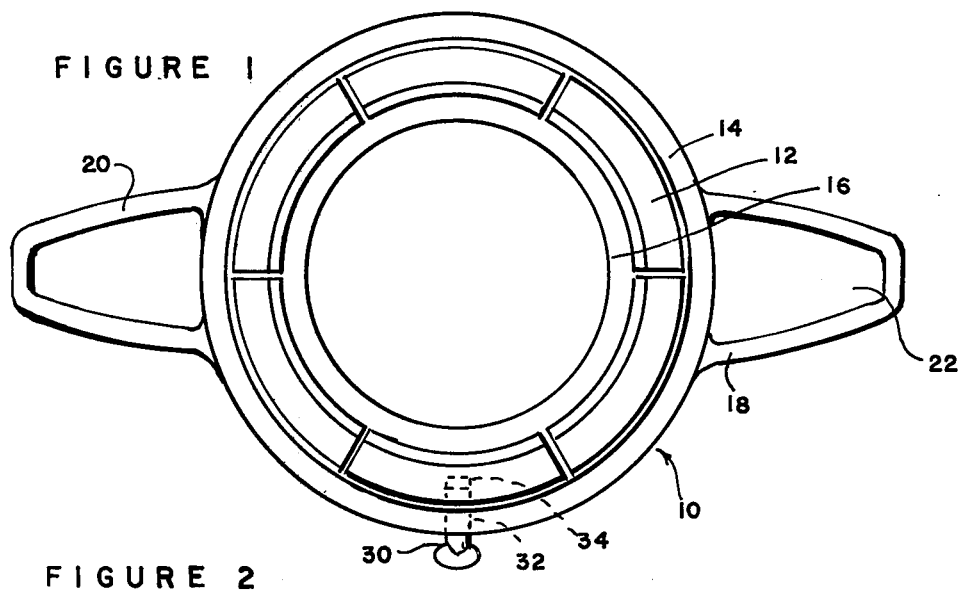
FIG. 1 is an end view of the coupling with its jaws in their contracted, locked positions.

Referring to FIG. 1, the coupling 10 has a plurality of segmented jaws 12 circumferentially disposed about a body member (not shown) and encircled by a surrounding cam ring 14. An annular gasket 16 is contained by jaws 12. The cam ring 14 can have a pair of radial arms 18 and 20 with open interiors 22. The arms are preferably used with the large diameter couplings; those fitting three inch diameter or larger conduits for ease connecting and disconnecting the coupling. Smaller diameter couplings can have wrench flats or knurling on the outer surface of the cam ring 14.

Figure 2:
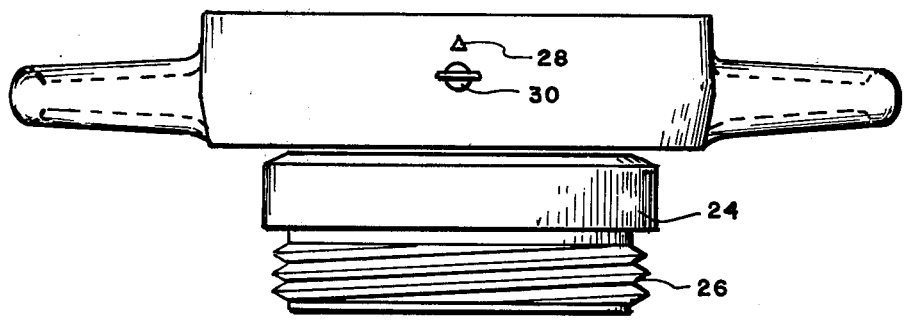
FIG. 2 is an elevational view of the coupling with its jaws in their contracted, locked positions.

The body 24 of coupling 10 appears in FIG. 2 as a circular sleeve having an externally threaded end 26 for removeable attachment to conventional threaded conduits, couplings and the like. An index mark 28 is located on the cam ring 14 to aid the user in connecting to a threaded conduit which bears a cooperative index mark. When the marks are aligned, the coupling can be secured to the receiving conduit with a quarter turn.

A lock pin 30 can also be provided in cam ring 14 which has a radial bore 32 to receive the pin which can be inserted into an axially aligned bore 34 in jaw 12a when the cam ring is in its forward position, with the jaws closed, as illustrated in FIGS. 1 and 2.

Figure 3:
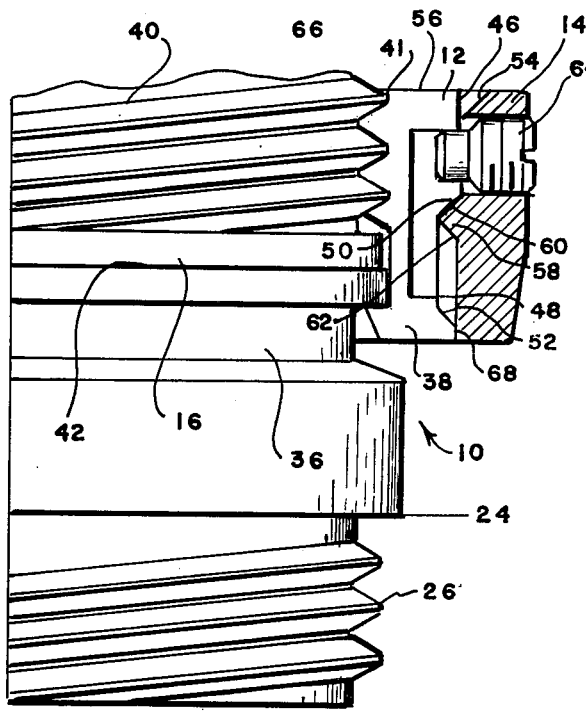
FIG. 3 is a partial elevational view of the coupling secured to a threaded conduit with the cam ring in sectional view.

Referring now to FIG. 3, the coupling 10 is shown with body member 24 bearing distal, peripheral groove 36. Each of the plurality of jaws 12 has an inner radial flange 38 at one end and conduit gripping means, preferably in the form of segmented internal helical threads 40 at its opposite end which, together, provide an internally threaded assembly. Seal means in the form of annular gasket 16 is mounted against the forward face 42 of body 24 to provide a fluid tight sealing of the assembly to a received threaded conduit 44.

The outer surfaces 46 of the jaws bear a flat groove 48 which has a leading beveled shoulder 50 and a trailing beveled shoulder 52 that serve as leading and trailing cam surfaces, respectively. Each cam surface is a conical segment with the leading cam surface inclined at 45 degrees and the trailing cam surface inclined at 45 degrees.

The cam ring 14 encircles the assembly of jaws 12 and has interior first and second cam guides. The first or leading cam guide 54 is located at the leading edge 56 of cam ring 14. The second cam guide 58 is triangular in cross section and is located intermediate the width of ring 14. The leading surface 60 of cam guide 58 is also inclined identically to cam guide 54 and leading cam surface 50. The trailing surface 62 of cam guide 58 is inclined identically to cam surface 52.

The assembly is retained by a plurality of set screws 64 which are mounted in cam ring 14 at spaced angular increments, preferably providing one screw per jaw. The set screws 64 project radially inwardly and are received in a plurality of substantially axially aligned grooves 66 in the exterior surface of each jaw 12.

Figure 4:
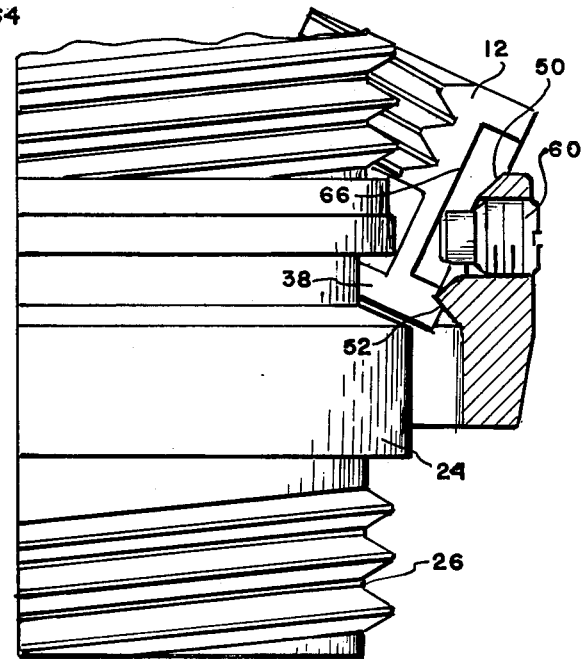
FIG. 4 is a partial elevational view of the coupling released from a threaded conduit with the cam ring in sectional view.

As apparent from a comparison of FIGS. 3 and 4, the cam ring 14 provides a positive action on the contraction (FIG. 3) and expansion (FIG. 4) of the jaw segments. Any axial movement of the cam ring 14 from its forwardmost position will release the trailing inner edge of ring 14 from the trailing edges 68 of jaws 12 and will retract leading surface 60 of cam guide 58 from cam surfaces 50 of jaws 12, releasing the jaws. The continued axial retraction of the cam ring 14 moves the latter to the position shown in FIG. 4 where the trailing surface 62 of cam guide 58 applies a force on the trailing cam surfaces 52 of the jaws, urging these jaws into an expanded, open position. Similarly, any forward movement of the cam ring from the position shown in FIG. 4 releases the jaws from their constrained, open positions. The leading cam guide 54 exerts a positive force on the forward cam surfaces 50 of the jaws urging them into a closed position and the jaws are locked in this position when cam guide surface 60 seats against the cam surfaces 50 of the jaws. It has been found that this construction provides a very desirable and positive action since any tolerance or slop in the axial travel of the cam ring is effectively eliminated.

The invention has been described with reference to the presented illustrated and preferred embodiment. It is not intended that the invention be unduly limited by this description of the illustrated, preferred embodiment. Instead, it is intended that the invention be defined by the means and their obvious equivalents, set forth in the following claims.

What is claimed is:

1. A coupling for interconnecting a pair of tubular members:
   (a) a body having a through opening and bearing attachment means at one end thereof permitting its removeable, fixed attachment to one of said pair of tubular members, and an annular groove at the opposite end thereof;
   (b) an assembly of a plurality of closely spaced, segmented arcuate jaws having outer segmented circular surfaces, each having:
   an inboard radial flange seated in said annular groove of said body to permit pivotal movement of said jaws between radially expanded and compressed positions, and a radial groove on the trailing portion of its outer surface with segmented conical leading and trailing shoulders; and
   (c) a cam ring surrounding the assembly of said jaws and axially-slidable thereon between forward and rearward positions with a cylindrical inside wall and an interior cam guide intermediate its width and having a triangular cross-section with leading and trailing surfaces having the same incline as the respective leading and trailing shoulders of said jaws whereby said cylindrical inside wall and the leading surface of said cam guide seat against the outer circular surface and leading shoulder, respectively, of each jaw when said ring is in its forward position and said trailing surface of said cam guide seats against the trailing shoulder of each jaw when said ring is in its rearward position.

2. The coupling of claim 1 including screws in said cam ring and cooperative, substantially-axial grooves in the outer surface of said jaws to receive said screws.

3. The coupling of claim 1 wherein said cam ring has a leading edge with an inclined cam guide surface having the same incline as said leading cam shoulders of said jaws.

4. The coupling of claim 1 wherein the attachment means of said body comprise an externally threaded end of said body.

5. The coupling of claim 4 wherein the inside leading surfaces of said segmented jaws together bear internal helical threads.

6. The coupling of claim 5 including an annular sealing washer carried on the forward face of said body.

* * * * *